US006986968B2

(12) United States Patent
Hong et al.

(10) Patent No.: US 6,986,968 B2
(45) Date of Patent: Jan. 17, 2006

(54) CATHODE ACTIVE MATERIAL FOR LITHIUM SECONDARY CELL AND METHOD FOR MANUFACTURING THE SAME

(75) Inventors: Young Sik Hong, Daejon-Shi (KR); Kwang Sun Ryu, Daejon-Shi (KR); Soon Ho Chang, Daejon-Shi (KR); Yong Joon Park, Daejon-Shi (KR); Young Gi Lee, Daejon-Shi (KR); Kwang Man Kim, Daejon-Shi (KR); Nam Gyu Park, Daejon-Shi (KR); Man Gu Kang, Daejon-Shi (KR); Xiang Lan Wu, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 281 days.

(21) Appl. No.: 10/323,731

(22) Filed: Dec. 20, 2002

(65) Prior Publication Data

US 2004/0072069 A1    Apr. 15, 2004

(30) Foreign Application Priority Data

Oct. 15, 2002  (KR)  ................. 10-2002-0062751

(51) Int. Cl.
  *H01M 4/58*    (2006.01)
  *C01B 25/45*   (2006.01)
  *C01B 17/98*   (2006.01)
(52) U.S. Cl. ............... 429/221; 429/231.5; 429/231.6; 429/231.95; 429/223; 429/229; 423/138; 423/306; 423/307; 423/551; 423/558
(58) Field of Classification Search ............... 423/138, 423/303, 306, 307, 551, 558; 429/221, 231.95, 429/231.5, 231.6, 223, 229
See application file for complete search history.

(56) References Cited

U.S. PATENT DOCUMENTS

| 2,301,103 | A | * | 11/1942 | Wilson et al. | ............... 423/558 |
| 5,194,241 | A | * | 3/1993 | Derka | ..................... 423/558 |
| 5,296,238 | A | * | 3/1994 | Sugiura et al. | ......... 423/306 X |
| 5,908,716 | A | * | 6/1999 | Barker | .................. 429/221 X |

(Continued)

OTHER PUBLICATIONS

Webmineral Internat Website: Page "Diadochite" http://webmineral.com/data/Diadochite.shtml, and page "Mineral Help" http://webmineral.com/help/IMAStatus.shtml (Sep. 2000).*

(Continued)

*Primary Examiner*—Stephen J Kalafut
(74) *Attorney, Agent, or Firm*—Mayer, Brown, Rowe & Maw LLP

(57) ABSTRACT

A cathode active material for a lithium secondary cell used in a cellular phone is disclosed. The cathode active material for the lithium secondary cell and the method the same having a high capacity and a long lifetime, different from $LiCoO_2$ and $LiMn_2O_4$, $Li(Ni, Co)O_2$, and V-system oxide that has been researched as the active material for substituting $LiCoO_2$ are provided. The cathode active material for the lithium secondary cell in the next formula 1 is obtained by heating or chemically treating diadochite $[Fe_2(PO_4)(SO_4)(OH) \cdot 6H_2O]$ that is the mineral containing $PO_4^{3-}$, $SO_4^{2-}$, and $OH^-$.

$$Li_aFe_bM_c(PO_4)_x(SO_4)_y(OH)_z \qquad (1)$$

In the formula, M is at least one element selected from a radical consisting of Mg, Ti, Cr, Mn, Co, Ni, Cu, Zn, Al, and Si, with $0 \leq a$, $c \leq 0.5$, $1 \leq b \leq 2$, $0.5 \leq x$, $y$, $z \leq 1.5$.

15 Claims, 3 Drawing Sheets

U.S. PATENT DOCUMENTS

| | | |
|---|---|---|
| 5,910,382 A | 6/1999 | Goodenough et al. |
| 6,187,192 B1 * | 2/2001 | Johnston et al. ......... 210/502.1 |
| 6,319,632 B1 | 11/2001 | Amine |
| 2004/0086445 A1 * | 5/2004 | Armand et al. ............. 423/306 |
| 2004/0111873 A1 * | 6/2004 | Okawa et al. .......... 423/307 X |

OTHER PUBLICATIONS

Young Sik Hong, et al : *Amorphouse $FePO_4$ as 3 V cathode material for lithium secondary batteries*; Journal of Materials Chemistry; Dec. 2002; pp. 1870-1874.

* cited by examiner

CATHODE ACTIVE MATERIAL FOR LITHIUM SECONDARY CELL AND METHOD FOR MANUFACTURING THE SAME

BACKGROUND OF THE INVENTION

1. Field of the Invention

The present invention relates to a cathode active material for a lithium secondary cell used in a cellular phone, more particularly, to a cathode active material for a lithium secondary cell capable of manufacturing the lithium secondary cell having excellent electrochemical characteristics, a high capacity and a long lifetime by using diadochite, and a method for manufacturing the same.

2. Description of the Prior Art

In recent, as an electronic technique has been actively developed, miniaturization and high functionality of new portable electronic machines such as video cameras, personal computers, portables phone and the like have been rapidly accomplished. Accordingly, the secondary cell used in the small-sized electronic device needs high energy density. In particular, the amount of the lithium secondary cell having a charging/discharging function and a high energy density is remarkably increased and the research for improving the performance thereof has been actively progressed widely.

In case of lithium secondary cell, an active material, which can insert and extract a lithium ion, is able to be used as an anode and a cathode and a space between the anode and the cathode is filled with an organic electrolyte or a polymer electrolyte within which lithium ions can be moved. At the charging, the electric energy is stored by the oxidation reaction while the extraction of the lithium ion is progressed, and at the discharging, the electric energy is generated by the reduction reaction.

The lithium metal was used as the anode active material, but at present it is mainly used only in the primary cell, because of the dangerousness such as explosion due to the formation of dendrite lithium. In order to overcome the shortcoming of forming the dendrite, a lithium-metal alloy is considered as a substitute for the lithium. However, the lithium-metal alloy has a problem that the volume thereof is extremely changed at the charging/discharging. In the electrochemical reaction, the change of volume and weak mechanical characteristics increase the irreversible capacity. Therefore, presently, a carbon is used as the anode of the lithium secondary cell commercially available, the carbon has high capacity and low oxidation/reduction potential compared with a metal oxide, a sulfide, and a polymer, and is stable in the structure and has an excellent charging/discharging lifetime.

Now, $LiCoO_2$ is generally used as the cathode active material. However, because the cobalt is very expensive, the research for using $LiNiO_2$, $LiMn_2O_4$, $LiNi_{1-x}Co_xO_2$, or $V_2O_5$ or the like as the cathode active material has been progressed. Here, $LiNiO_2$, and $LiNi_{1-x}Co_xO_2$ have a difficulty in the synthesis thereof and a problem in the stability, and $LiMn_2O_4$ has a problem that the capacity is lastingly reduced at charging/discharging, and $V_2O_5$ has poor voltage characteristics. Therefore, in order to use the cathode active material capable of substituting $LiCoO_2$, a lot of the researches are necessary.

The research for the development of a new cathode active material has been attempted until now. For the first time, the research on $LiFePO_4$ used as the cathode active material was reported in 1997. Since $LiFePO_4$ has excellent flatness profile of voltage, high average potential of 3.4 V and theoretical discharging capacity of 170 mAh/g, it has taken notice [see, A. K Padhi et al. J. Electrochem. Soc. 1188, 1997, and J. B Goodenough et al. U.S. Pat. No. 5,910,382]. Early in the research, $LiFePO_4$ showed the reversible capacity of about 120 mAh/g under the very slow current density.

Recently, the research for the $LiFePO_4$ composite capable of showing the capacity equal to and more than 150 mAh/g in a high rate of the charging/discharging by improving greatly the electric conductivity by means of carbon coating and metal ion doping is announced [See F. Croce et al. Electrochem. Solid-State Lett. 5, A47, 2002 and N. Ravet et al. EP 1049182 A2]. However, synthesis of $LiFePO_4$ composite for improving the electric conductivity has a problem that various complexmical steps are added to the conventional synthesis steps and a difficulty in commercialization, since the synthesis is accomplished at a refined reduction atmosphere. Also, the requirement of high capacity for the portable information communication has not been satisfied with the theoretical capacity of 170 mAh/g.

SUMMARY OF THE INVENTION

Thus, the present invention is to solve the problems generated by using $LiFePO_4$ complex as the cathode active material, and an object of the present invention is to provide a cathode active material for the lithium secondary cell having excellent electrochemical characteristics obtained by mixing a diadochite mineral which can be easily obtained in a natural state with metal salt and heating it in the atmosphere.

Another object of the present invention is to provide the cathode active material for the lithium secondary cell capable of using the electric energy in the region of 3 V and 1.7 V.

In order to achieve the above-mentioned object, according to an aspect of the present invention, the cathode active material for the lithium secondary cell contains diadochite represented by the next formula (2).

$$Fe_2(PO_4)(SO_4)(OH) \tag{2}$$

According to yet another aspect of the present invention, the cathode active material for the lithium secondary cell contains diadochite with water as the next formula (3).

$$Fe_2(PO_4)(SO_4)(OH) \cdot 6H_2O \tag{3}$$

According to yet another aspect of the present invention, the cathode active material for the lithium secondary cell contains diadochite represented by the next formula (4).

$$Li_aFe_bM_c(PO_4)_x(SO_4)_y(OH)_z \tag{4}$$

In this formula, M is at least one element selected from a group consisting of Mg, Ti, Cr, Mn, Co, Ni, Cu, Zn, Al, and Si, with $0 \leq a$, $c \leq 0.5$, $1 \leq b \leq 2$, $0.5 \leq x$, y, $z \leq 1.5$.

According to yet another aspect of the present invention, the method for manufacturing the cathode active material for the lithium secondary cell, comprises the steps of mixing diadochite powder, lithium salt, and metal salt with a solution; drying the mixture obtained in the mixing step; and heating the dried mixture.

Preferably, the lithium salt is lithium sulfate, lithium acetate, lithium carbonate, lithium hydroxide, lithium nitrate, or lithium citrate, and the metal salt is nitrate, acetate, or citrate of Mg, Ti, Cr, Mn, Co, Ni, Cu, Zn, Al, or Ga, and the solution is distilled water, methanol, ethanol, or acetone.

Preferably, the solution is mixed with a chelating agent, and the chelating agent is a ploymer having —OH, —O—, or —COOH radical capable of coordinating a metal ion.

According to yet another aspect of the present invention, the method for manufacturing the cathode active material for the lithium secondary cell comprises the steps of mixing diadochite powder, lithium salt, and metal oxide with a solution; drying the mixture a mixture obtained in the mixing step; and reacting the dried mixture in a solid state reaction method.

Preferably, the lithium salt is lithium sulfate, lithium acetate, lithium carbonate, lithium hydroxide, lithium nitrate, or lithium citrate, and the solution is acetone or ethanol, and the step of reacting is performed at a temperature of 300–600° C.

BRIEF DESCRIPTION OF THE ATTACHED DRAWINGS

(D), and 600° C. (E) as the cathode and using the lithium metal as the anode according to the examples of the present invention, respectively.

Figure 4:
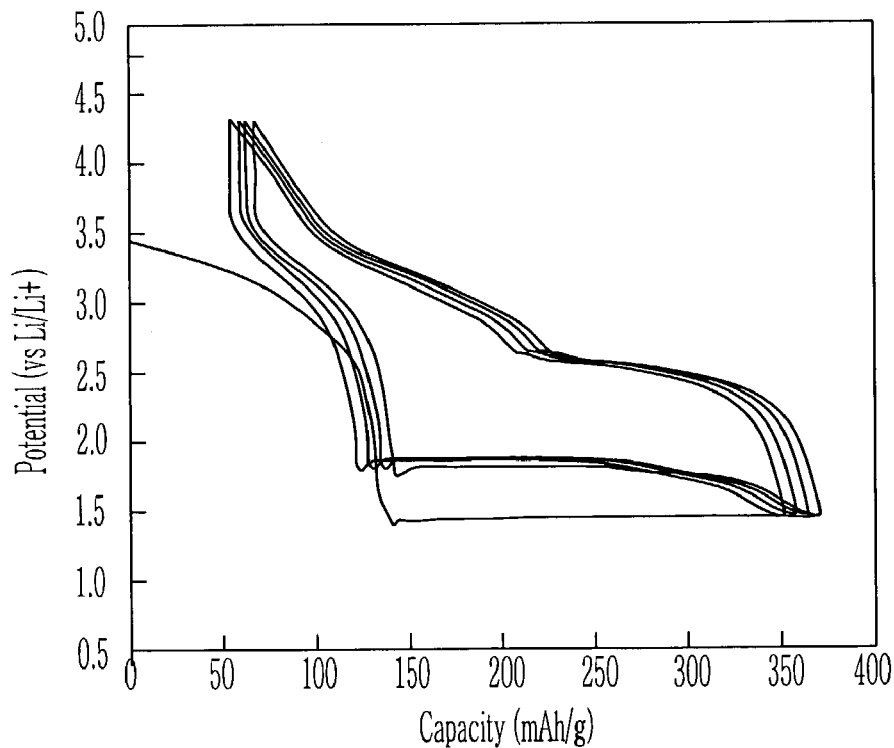

FIG. 4 is a graph showing the charging-discharging curve of the half cell using the active material obtained by the heating treatment of 500° C. as the cathode and using the lithium metal as the anode according to the example of the present invention.

Figure 5:
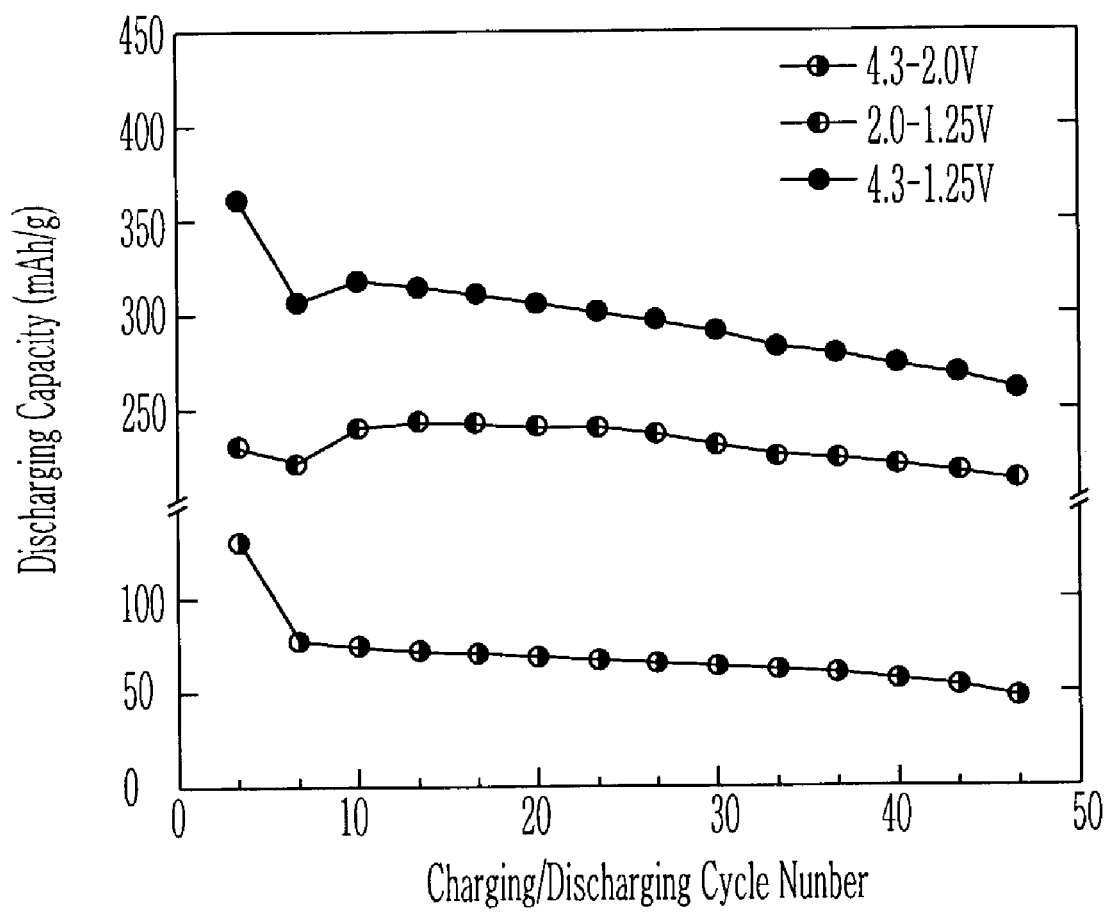

FIG. 5 is a graph showing all the discharging capacities, wherein the potential section thereof is divided into two sections of 4.3–2.0V and 2.0–1.25 V.

DESCRIPTION OF THE PREFERRED EMBODIMENT

The present invention uses diadochite that can be easily obtained in the natural state as the cathode active material for the lithium secondary cell. The diadochite of the natural state contains water. The present invention uses the diadochite [$Fe_2(PO_4)(SO_4)(OH)\cdot(6H_2O)$] containing the water therein or the diadichite [$Fe_2(PO_4)(SO_4)(OH)$] in which water is removed by a heating treatment as the cathode active material for the lithium secondary cell.

In addition, powders of cathode active material are made by mixing and heating diadochites with various kinds of compounds. They are molded into a film shape together with a conductive agent and a binder to manufacture the cathode plate for the lithium secondary cell.

Hereinafter, the embodiments of the present invention will be explained with reference to the accompanying drawings.

The diadochite [$Fe_2(PO_4)(SO_4)(OH)\cdot(6H_2O)$] which can be easily obtained in the natural state is pulverized to the sample having a fine powder shape by using a mortar and then the powder having a small size is obtained by a sieve. The diadochite powders obtained are added to the metal salt solution in which lithium salt and metal salt are melted. At this time, a chelating agent is also mixed.

The metal salt solution is made by dissolving the lithium salt and the metal salt into a solution such as distilled water, methanol, ethanol, or acetone. As the lithium salt, lithium sulfate, lithium acetate, lithium carbonate, lithium hydroxide, lithium nitrate, or lithium citrate can be used, and, as the metal salt, nitrate, sulfate, acetate, or citrate of the metal consisting of Mg, Ti, Cr, Mn, Co, Ni, Cu, Zn, Al, or Si can be used. Preferably, a polymer having —OH, —O—, or —COOH radical can be used as chelating agent. In case of citrate, COO⁻ group coordinates the metal ion while adjusting the concentration of the hydrogen ion with aqueous ammonia. Preferably, lithium acetate dihydrate can be used as the lithium salt, maganese acetate tetrahydrate can be used as the metal salt, and polyethylene glycol (PEG, molecular weight: 10,000) can be used as the chelating agent. The lithium salt, the metal salt, and the chelating agent are not limited to the above-mentioned materials.

The mixture of the diadochite power, the lithium salt, the metal salt, and the chelating agent is stirred at the temperature of about 80° C. to evaporate the solution and the lithium, the metal ion, and the chelating agent form gel on the surface of the diadochite. The gel is heated at the temperature of 300–600° C. to perfectly burn the chelating agent, thereby the powder in the next formula 5 is obtained. Such powder is pulverized by the mortar again.

As another embodiment, the diadochite powder is put in the mortar together with the lithium salt and the metal oxide, and is mixed with the acetone or the ethanol. The powder in the following formula 5 is obtained by using the solid state reation method of raising the temperature by 200° C. per time at the electric furnace and reacting it at the temperature of 300–600° C. The oxide containing the metal such as Mg, Ti, Cr, Mn, Co, Ni, Cu, Zn, or Al is used as the metal oxide.

$$Li_aFe_bM_c(PO_4)_x(SO_4)_y(OH)_z \qquad (5)$$

In the formula, M is at least one element selected from a group consisting of Mg, Ti, Cr, Mn, Co, Ni, Cu, Zn, Al, and Si, with $0 \leq a$, $c \leq 0.5$, $1 \leq b \leq 2$, $0.5 \leq x, y, z \leq 1.5$.

The cathode active material made in the above-mentioned method has the discharging potential (3.2 V) lower than that (about 3.7 V) of $LiCoO_2$ and the discharging capacity (100 mAh/g) smaller than that of $LiCoO_2$. The cathode active material made in the above manner has the energy that can be used at the region equal to and more than 3 V, smaller than that of $LiCoO_2$. But, when the discharging is continuously performed until 1.25 V, a new flat discharging potential is formed at 1.3 V in a first time and is formed at 1.7 V after a second time, and the discharging capacity becomes equal to and more than about 200 mAh/g at the region equal to and less than 2 V. Accordingly, the cathode active material of the present invention can be mostly used in the cellular phone having the region of 3.2 V and a primary cell having the region of 1.5 V, and can be used in the two discharging potentials, in accordance with the object thereof.

Conventionally, if the ferrous (Fe) compound is used, the irreversible capacity is very increased when the oxidation state of the iron is reduced to the number equal to and less than 2+ upon the discharging. But, in the present invention, though the oxidation state of the iron is reduced to the number equal to and less than 2+, the discharging capacity due to the increment of the cycle number is nearly uniform to show excellent reversibility. Accordingly, the cathode active material of the present invention has a more excellent electrical property than the conventional cathode active material containing the ferrous compound. Also, in the present invention, since one compound can be used in different two regions, a functional lithium secondary cell can be manufactured.

Hereinafter, the present invention will be explained by preferred examples and comparative examples. The below-mentioned examples are only the preferred examples of the present invention and are not limited to that.

EXAMPLE 1

Lithium acetate dihydrate and lithium sulfate as the lithium salt, maganese acetate tetrahydrate as the metal salt, and polyethylene glycol (PEG, molicular weight: 10,000) as the chelating agent were dissolved in the water at an appropriate mole ratio, and then the diadochite powder was added thereto and the mixture was dried. The mixture was heated at the atmosphere having the temperature of 300° C. to obtain the powdered cathode active material.

In order to evaluate the charging-discharging characteristics of the cathode active material obtained by the heat treatment of 300° C., the cathode active material, the conductive agent, and the binder were mixed at the ratio of 70:25:5 to manufacture the cathode. As the conductive agent and the binder, super P carbon and polyvinylidenefluoride (PVDF) were used. By using the cathode manufactured in the above-mentioned method, the lithium metal anode, and the electrolyte of the mixed solution (1:1, volume ratio) consisting of ethylene carbonate and dimethyl carbonate in which 1M $LiPF_6$ is dissolved, a half cell having a coin shape was manufactured in a glove box. The charging-discharging evaluation was performed under condition that the potential range is in 4.3 V–2.0 V and 4.3 V–1.25 V and the current density is 10 mAh/g.

EXAMPLE 2

The example 2 was performed in the method equal to the example 1, except for that the cathode active material was obtained by the heating treatment of 500° C.

EXAMPLE 3

The example 3 was performed in the method equal to the example 1, except for that the cathode active material was obtained by the heating treatment of 600° C.

COMPARATIVE EXAMPLE 1

An amorphous $FePO_4 \cdot 2HO_2$ purchased from Aldrich chem. co. was heated at the temperature of 350° C. to obtain an amorphous $FePO_4$. The comparative example 1 was performed in the method equal to the example 2, except for the obtained amorphous $FePO_4$ was used as the cathode active material.

Figure 1:
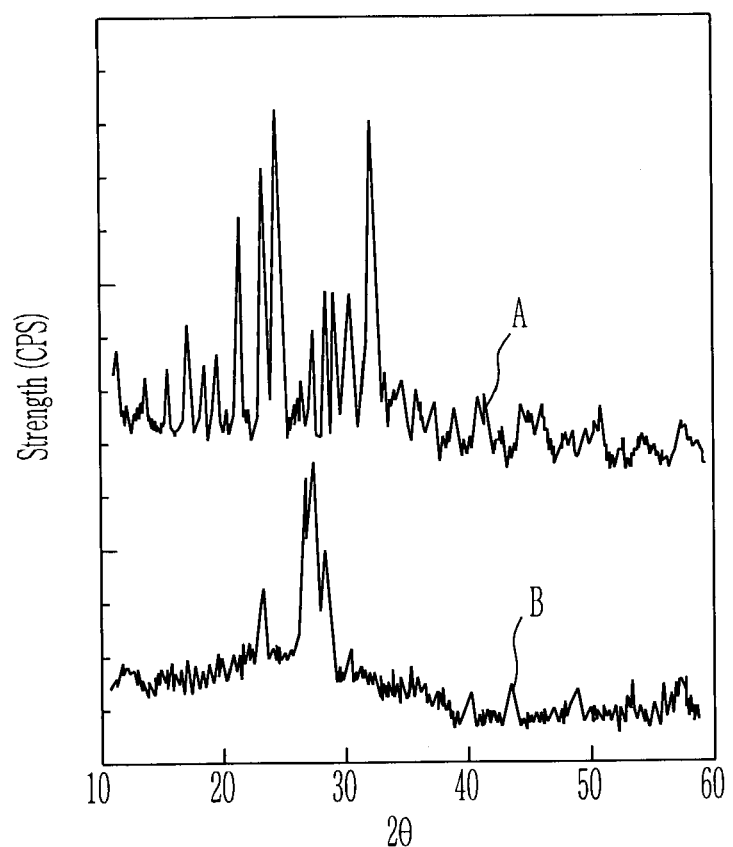
FIG. 1 is a diagram showing X-ray diffraction analysis of diadochite (A) used in the present invention and a cathode active material (B) obtained by using the same.

FIG. 1 illustrates the X-ray diffraction result of the powdered cathode active material (B) obtained by the heating treatment of 500° C. in the example 2. As is seen from the X-ray diffraction result, after the heating treatment, a compound of a perfectly different crystal structure is formed.

Figure 2:
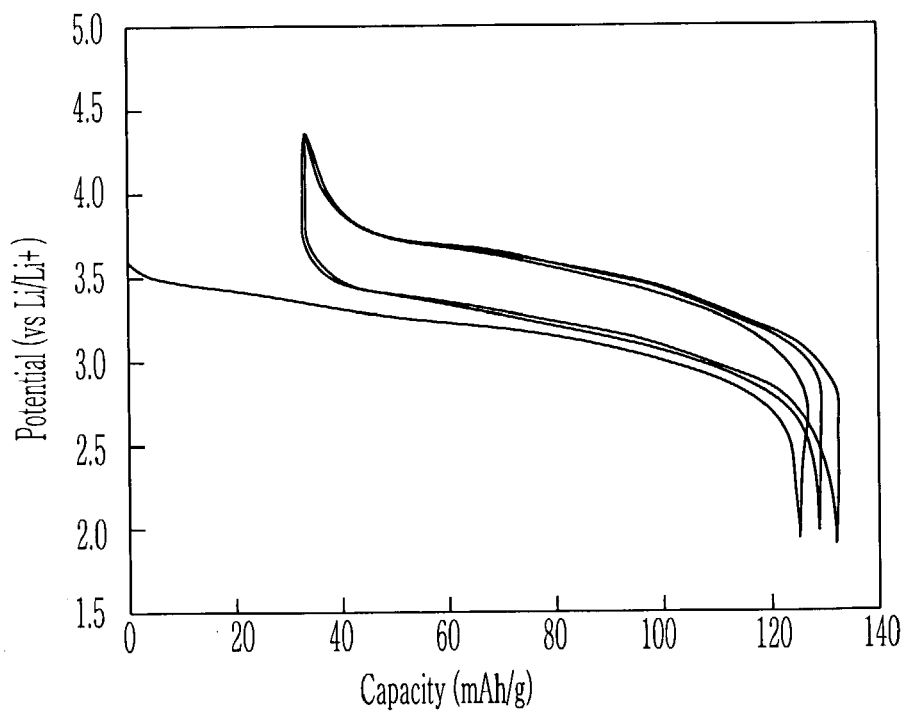
FIG. 2 is a graph showing charging-discharging curve of a half cell using an active material obtained through a heating treatment of 500° C. as a cathode and using a lithium metal as an anode according to an example of the present invention.

FIG. 2 is the charging/discharging curve of the half cell using the active material obtained by the heating treatment of 500° C. in the example 2 as the cathode and the lithium metal as the anode and is charging/discharging result measured by the method described in the example 1. The charging/discharging potential in case of using the cathode active material obtained by the heating treatment of 500° C. is 3.4 V/3.2 V. This value is lower than the 3.5 V/3.4 V that is the charging/discharging potential in case of using $LiFePO_4$, but is higher than 3.2 V/2.8 V that is the charging/discharging potential in case of using the amorphous $FePO_4$ in the comparative example 1. Generally, since the average potential of the compound having a sulfate group ($SO_4^{2-}$) is higher than that of the compound having a phosphate group ($PO_4^{3-}$), it is expected that the cathode active material of the present invention has high potential, but the potential is compensated by a hydroxide radical ($OH^-$).

Figure 3:
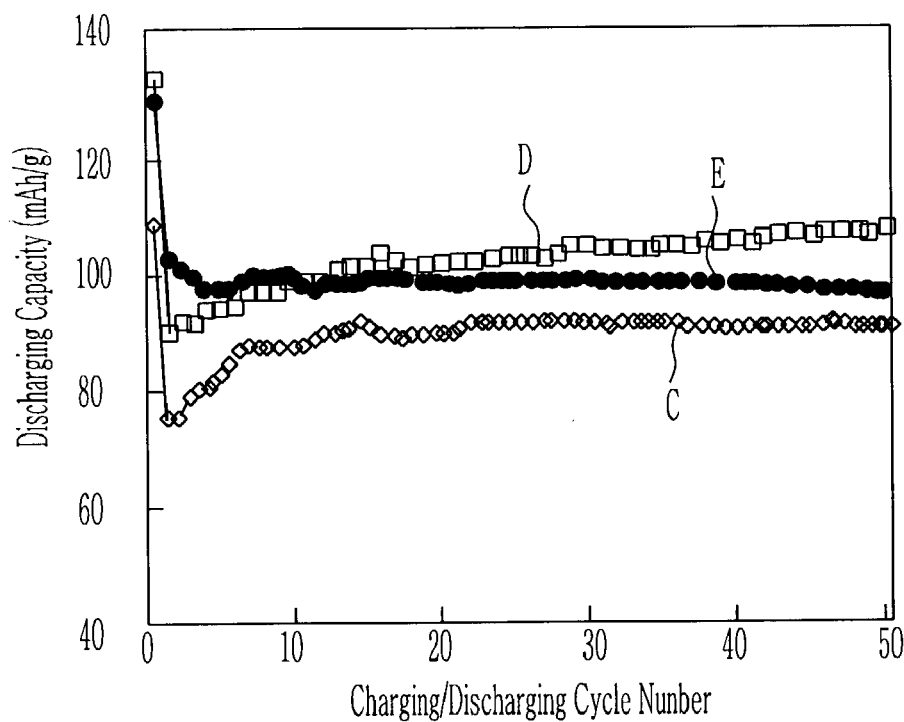
FIG. 3 is a graph showing discharging capacities of the half cells using the active materials obtained by the heating treatments of 300° C. (C), 500° C.

FIG. 3 is a charging-discharging curve of the half cells using the active material obtained by the heating treatment of 300° C. (C), 500° C. (D), 600° C. (E) in the examples 1 to 3 as the cathode and the lithium metal as the anode, respectively. The half cell using the active material (D) obtained through the heating treatment of 500° C. (D) as the cathode shows a largest discharging capacity and maintains the capacity of 110 mAh/g in the cycle equal to and higher than 60 cycles. The half cells C and E using the active material obtained by the heating treatment of 300° C. and 600° C. maintains the capacities of 90 mAh/g and 100 mAh/g, respectively. Be noted that a strong covalent bond of P—O and S—O bond contributes to the structural stability in the cathode active material of the present invention, similarly to $LiFePO_4$.

FIG. 4 is a charging-discharging curve of the half cell using the active material obtained through the heating treatment of 500° C. in the example 2 as the cathode and the lithium metal as the anode. It is noted that the half cell using the active material obtained through the heating treatment of 500° C. has a discharging potential of 3.2 V and 1.7 V. This exceeds the theoretical capacity due to the oxidation-reduction pair of $Fe^{3+/2+}$ of the cathode active material of the present invention, and means that a different oxidation-reduction pair exists together with an oxidation reduction pair of $Fe^{3+/2+}$. In spite of such excess oxidation-reduction, very reversible charging-discharging characteristics are shown. Accordingly, it is noted that the cathode active material of the present invention is a very excellent cathode material for the lithium secondary cell. On the other hand, the amorphous $FePO_4$ in the comparative example is discharged in 2.8 V and 1 V, and the initial discharging capacity is about 350 mAh/g, but is largely decreased while the cycle is progressed.

FIG. 5 is a graph showing all the discharging capacities obtained by the charging-discharging curve in FIG. 4, wherein the potential section thereof is divided into two sections of 4.3–2.0 V and 2.0–1.25 V. In this case, the capacities in the two sections are similarly decreased, but, in case of the cathode active material obtained through the heating treatment of 600° C., the capacities in the two sections is hardly decreased and the reversibility is very excellent.

As mentioned above, the material of present invention is more economical than $LiCoO_2$, currently used as the cathode active material, and has the capacity similar to that of $LiMn_2O_4$ that has been researched as an alternative cathode active material at the region of 3 V. Also, since a new reversible discharging is generated at the region of 1.7 V, the cathode active material for the lithium secondary cell that can stably use the discharging potential of a different region in accordance with the use thereof is provided. Also, the conventional $LiFe(PO_4)(SO_4)_2$ formed by changing $LiFePO_4$ or the amorphous $FePO_4$ maintains the charge neutrality by compensating the imbalance of the charge due to the introduction of $SO_4^{2-}$ group with the lithium, but, in the present invention, the imbalance of the charge is compensated with $OH^-$ group as mentioned in the next formula (6), thereby the electrochemical property can be changed, while varying the amount of x, y, and z in the formula (3).

$$Li_aFe_bM_c(PO_4)_x(SO_4)_y(OH)_z \qquad (6)$$

In the formula, M is at least one element selected from a group consisting of Mg, Ti, Cr, Mn, Co, Ni, Cu, Zn, Al, and Si, with $0 \leq a$, $c \leq 0.5$, $1 \leq b \leq 2$, $0.5 \leq x, y, z \leq 1.5$.

Although the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, with departing from the spirit and scope of the present invention.

What is claimed is:

1. The cathode active material for a lithium secondary cell, containing diadochite represented by the formula (9):

$$Li_aFe_bM_c(PO_4)_x(SO_4)_y(OH)_z \qquad (9)$$

wherein M is at least one element selected from a group consisting of Mg, Ti, Cr, Mn, Co, Ni, Cu, Zn, Al, and Si, with $0 \leq a$, $c \leq 0.5$, $1 \leq b \leq 2$, $0.5 \leq x, y, z \leq 1.5$.

2. A method for manufacturing a cathode active material for a lithium secondary cell, comprising the steps of: mixing diadochite powder, lithium salt, and metal salt with a solution; drying a mixture obtained in said mixing step; and heating said dried mixture.

3. The method for manufacturing a cathode active material for a lithium secondary cell according to claim 2, wherein said lithium salt is lithium sulfate, lithium acetate, lithium carbonate, lithium hydroxide, lithium nitrate, or lithium citrate, and said metal salt is nitrate, acetate, or citrate of Mg, Ti, Cr, Mn, Co, Ni, Cu, Zn, Al, or Ga.

4. The method for manufacturing a cathode active material for a lithium secondary cell according to claim 2, wherein said solution is distilled water, methanol, ethanol, or acetone.

5. The method for manufacturing a cathode active material for a lithium secondary cell according to claim 2, wherein said solution is mixed with a chelating agent.

6. The method for manufacturing a cathode active material for a lithium secondary cell according to claim 5, wherein said chelating agent is a ploymer having —OH, —O—, or —COOH radical capable of coordinating a metal ion.

7. The method for manufacturing a cathode active material for a lithium secondary cell according to claim 5, wherein said chelating agent is polyethylene glycol (PEG).

8. The method for manufacturing a cathode active material for a lithium secondary cell according to claim 2, wherein said step of heating is performed at a temperature of 300–600° C.

9. A method for manufacturing a cathode active material for a lithium secondary cell, comprising the steps of: mixing diadochite powder, lithium salt, and metal oxide with a solution; drying said mixture a mixture obtained in said mixing step; and reacting said dried mixture in a solid state reaction method.

10. The method for manufacturing a cathode active material for a lithium secondary cell according to claim 9, wherein said lithium salt is lithium sulfate, lithium acetate, lithium carbonate, lithium hydroxide, lithium nitrate, or lithium citrate, and said solution is acetone or ethanol.

11. The method for manufacturing a cathode active material for a lithium secondary cell according to claim 9, wherein said step of reacting is performed at a temperature of 300–600° C.

12. A portable electronic machine comprising:
a lithium secondary cell, the lithium secondary cell comprising a cathode active material containing diadochite represented by the formula (7):

$$Fe_2(PO_4)(SO_4(OH)) \qquad (7).$$

13. The portable electronic device according to claim 12, wherein said diadochite further contains water as the formula (8):

$$Fe_2(PO_4)(SO_4(OH)).6H_2O \qquad (8).$$

14. A device for providing power to a portable electronic machine comprising:
a lithium secondary cell, the lithium secondary cell comprising a cathode active material containing diadochite represented by the formula (7):

$$Fe_2(PO_4)(SO_4(OH)) \qquad (7).$$

15. The device according to claim 14, wherein said diadochite further contains water as the formula (8):

$$Fe_2(PO_4)(SO_4(OH)).6H_2O \qquad (8).$$

* * * * *